W. W. BURSON.
GRAIN BINDER.
No. 28,830.
Patented June 26, 1860.
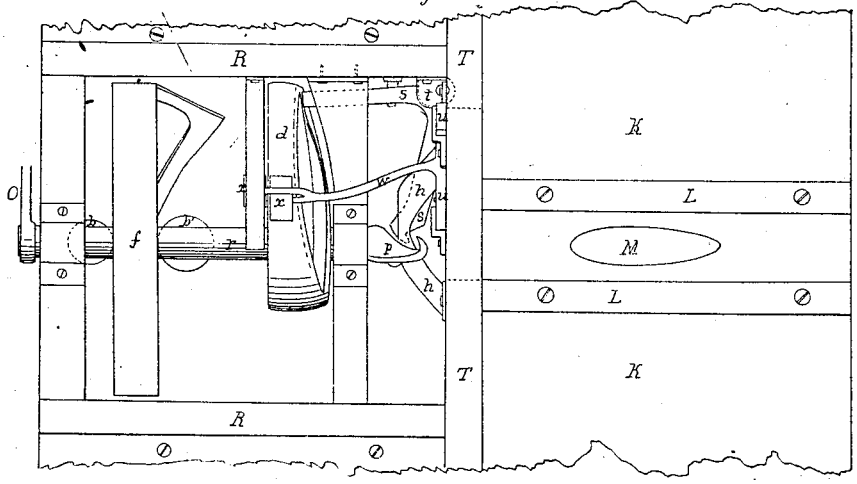
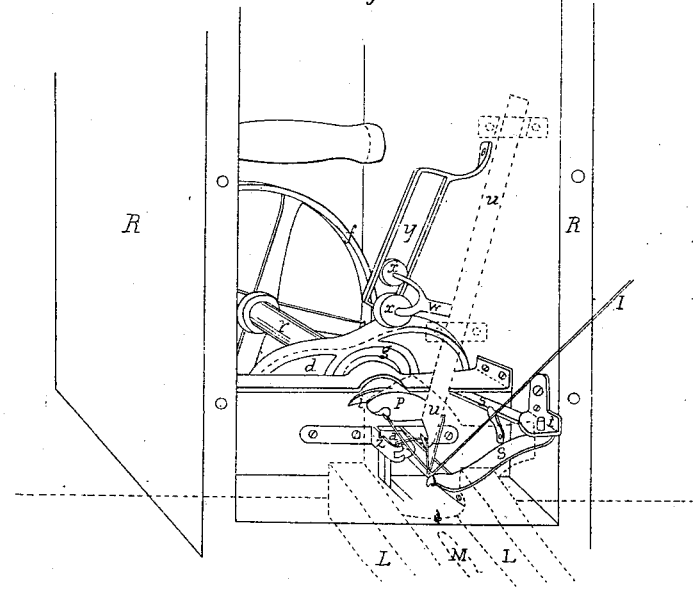
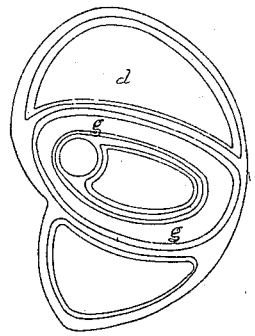
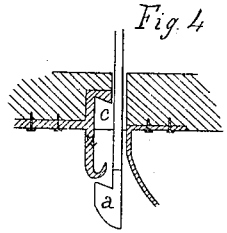
Witnesses
A. M. Swan
William D. Perrine
Inventor
W. W. Burson

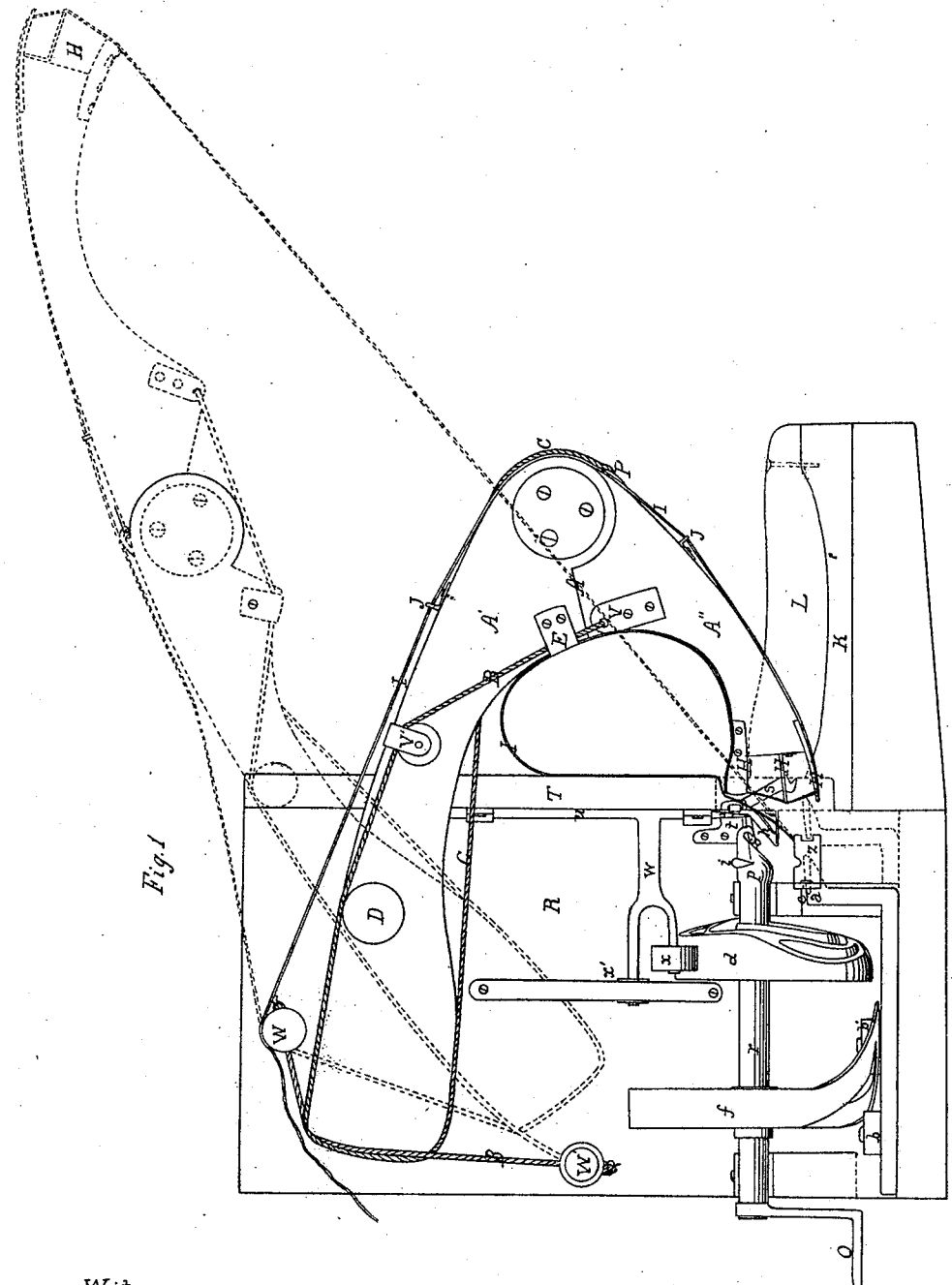

UNITED STATES PATENT OFFICE.

W. W. BURSON, OF YATES CITY, ILLINOIS.

IMPROVEMENT IN GRAIN-BINDERS.

Specification forming part of Letters Patent No. 28,830, dated June 26, 1860.

*To all whom it may concern:*

Be it known that I, W. W. BURSON, of Yates City, in the county of Knox and State of Illinois, have invented a new and useful Grain-Binder; and I do hereby declare that the following is a full, clear, and exact description of the same, reference being had to the annexed drawing, forming part of this specification, in the several figures of which similar characters of reference denote the same part.

Figure 1 is a side elevation, the upright R being removed. Fig. 2 is a top view, the arm A and its attachments being removed. Fig. 3 is a front perspective view of the devices for tying, cutting, and fastening the twine, the grain-board T being removed. Fig. 4 is a top view of the hooks $a$ and $z$ and receptacle $c$. Fig. 5 is a face view of cam-wheel $d$.

My invention has reference to binding grain (with twine) upon the platform of any reaping-machine before it (the grain) is thrown upon the ground; and consists of certain combinations of devices hereinafter to be set forth.

In the drawing, R R support the jointed arm A by rod D. The grain-board T protects the tying apparatus, and serves as a support for hook $u$. The platform K receives the grain preparatory to binding. L L are guides to the arm A across the platform K. The opening M in the platform K allows the blades and other rubbish to fall through without interfering with the tying apparatus. The cord C is attached to the part A″ of jointed arm A, around the rear portion of said arm to the fastening W.

The cords B are attached to A″ at V, and pass through E, over pulley V′, around the rear portion of A′ to their fastening W′. The crank O rotates the shaft $r$, upon which are fastened the cam-wheels $f$ and $d$, the cutting-point $i$, and hook P. The hook $u$ rests upon wheel $d$ by forked arm $w$, relieved by friction-roller $x$, the upper part moving in slot $y$, relieved by roller H′. The bent lever S moves upon bearing $t$, the rear end working in track $g$ of cam-wheel $d$.

The hook $a$ is made somewhat wedge-shaped, and fits its receptacle $c$, Fig. 4, and is held firmly in said receptacle by wheel $f$ pressing upon friction-roller $b$ until the cam upon said wheel drives it forward to slotted hook $z$, and immediately brings it back to its place of rest.

The cutting-point $i$ is fastened upon shaft $r$, and severs the twine after the knot is tied by the rotation of said shaft, allowing the sheaf to be removed from the platform K.

In operating the machine and preparing for the grain, and for the placing of twine around the grain and tying a knot, and thereby forming a band around the same, the twine I is passed through the loops J J, thence through the hole in nozzle-piece H, and being by the operator placed upon slotted hook $z$, one revolution of the crank O draws it into the receptacle $c$ and holds it securely. With right hand the operator then takes hold of arm A′, forward of D, and by raising it the rear portion presses upon cord C and extends the arm, as shown in Fig. 1, (dotted lines.) The tying apparatus then being in position, as shown in Fig. 2, the machine is in readiness for the grain upon platform K when placed thereon. Then arm A′ is moved downward; the rear part presses upon cords B, which draw arm A″ downward and across the platform K under the grain. The nozzle-pieces H H H, passing severally below, between $z$ and above the hooks P and Z, direct and drive the portion of twine which is stretched from the hole and over notches in nozzle-pieces H H H upon said hooks, which now hold the band material for completing the bound sheaf. The arm is then backed an inch or two for the purpose of preventing interference with the knot-tying apparatus. When the operator with his left hand turns the crank O to the right, the rear end of lever S in groove $g$ is brought inward toward the center, thereby moving the front end with twine forward and outward, and also thereby assisting in forming space for the descent of hook $u$ when the hook P has formed a loop. The hook $u$, obeying the shape of cam-wheel $d$, now descends into said loop, and passing below the twine stretched from hook $z$ to lever S, it draws it upward through the loop. Simultaneously with the upward movement of hook $u$ the lever S returns to its position of rest under shield $h$, and the hook $a$, which is now driven forward by the cam upon wheel $f$, suddenly releases the twine it was holding, its rounded end passes beyond the twine, and on its return it carries and firmly wedges it into receptacle $c$, thereby forming and securing the band for the next sheaf. Then the cutting-point $i$ severs the twine, and the sheaf is ready for removal when the arm is again raised.

In constructing the machine, the shaft R is placed horizontally. The hook P is placed eccentrically upon the shaft R, thereby permitting hook $u$ to enter the said loop at the left side of said shaft, which arrangement, assisted by the oblique position of hook $u$, removes the loop from hook $p$ by its rotation.

The bent lever S is obtusely pointed, which form permits shield $h$ to remove the twine from said point when the knot is being tied. The hook P is placed superior to, or above and perpendicularly to, hook $z$, which form and arrangement is necessary in order to insure their certain reception of twine from nozzle-pieces on arm A''. The hook $z$ is parted and has a groove, in which hook $a$ passes, thereby causing it to act with certainty in securing or taking the twine from said hook $z$, and permitting a continuous renewal of the aforesaid operations until the ball or spool of twine is exhausted.

What I claim, and desire to secure by Letters Patent, is—

1. Extending and contracting the fore arm A'' by the action of the rear portion of A' upon the cords B and C, substantially as set forth.

2. The combination of the hooks $z$ P $u$ and the bent lever S, operating substantially as described.

3. The arrangement of hooks P and $u$, whereby the latter is passed through the loop, substantially as and for the purposes described.

4. The arrangement of lever S in combination with shield $h$, acting substantially as and for the purpose set forth.

5. The slitted hook $z$, in combination with hook $a$ substantially as described, for the purpose specified.

6. The hook $a$ and receptacle $c$, arranged and operating together, substantially as described, and for the purposes set forth.

W. W. BURSON.

Attest:
L. B. MARTIN,
PERRY LAWSON.